United States Patent
Tsugihashi et al.

(10) Patent No.: US 9,121,466 B2
(45) Date of Patent: Sep. 1, 2015

(54) DAMPING STRUCTURE

(75) Inventors: Kazuki Tsugihashi, Kobe (JP); Akio Sugimoto, Kobe (JP); Zenzo Yamaguchi, Kobe (JP); Kyoko Masuda, Kobe (JP); Yoshio Yano, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 810 days.

(21) Appl. No.: 13/138,851

(22) PCT Filed: Apr. 9, 2010

(86) PCT No.: PCT/JP2010/056474
§ 371 (c)(1),
(2), (4) Date: Oct. 7, 2011

(87) PCT Pub. No.: WO2010/117067
PCT Pub. Date: Oct. 14, 2010

(65) Prior Publication Data
US 2012/0024645 A1  Feb. 2, 2012

(30) Foreign Application Priority Data

Apr. 9, 2009 (JP) ................................ 2009-095080
Apr. 5, 2010 (JP) ................................ 2010-086833

(51) Int. Cl.
*F16F 15/02* (2006.01)
*F16F 7/01* (2006.01)
*F16F 15/36* (2006.01)

(52) U.S. Cl.
CPC ............... *F16F 7/015* (2013.01); *F16F 15/363* (2013.01)

(58) Field of Classification Search
CPC ........... F16F 7/01; F16F 7/015; F16F 15/363; F16F 15/366

USPC .................................................. 188/268, 378
See application file for complete search history.

(56) References Cited

U.S. PATENT DOCUMENTS

2007/0012530 A1*  1/2007  Garcia .......................... 188/268
2012/0024646 A1*  2/2012  Tsugihashi et al. ........... 188/268

FOREIGN PATENT DOCUMENTS

| CN | 101023227 A | 8/2007 |
| JP | 06-288463 | 10/1994 |

(Continued)

OTHER PUBLICATIONS

International Search Report for Application PCT/JP2010/056474 mailed May 25, 2010.

(Continued)

*Primary Examiner* — Bradley King
(74) *Attorney, Agent, or Firm* — Studebaker & Brackett PC (57) ABSTRACT

According to the invention, there is provided a damping structure capable of obtaining a sufficient damping effect even against vibrations of small amplitudes, by promoting movements of powder/particle materials inside a hollow body. In the damping structure of the invention, a damping member 2 is provided on a structure 1 to be damped. The damping member 2 includes a hollow body 5 which is filled with powder/particle materials 3, partially leaving a space 4. A vibration wall face part 7 which vibrates more violently than the structure 1, on receiving vibration, is formed in at least a part of wall face parts 6 of the hollow body 5. The vibration wall face part 7 is preferably formed of a material having a lower elastic modulus and/or a lower density than the other parts.

5 Claims, 11 Drawing Sheets

(56) References Cited

FOREIGN PATENT DOCUMENTS

| | | |
|---|---|---|
| JP | 10-306851 | 11/1998 |
| JP | 2000-046103 | 2/2000 |
| JP | 2000-046106 | 2/2000 |
| JP | 2001-219848 | 8/2001 |
| JP | 2001-349372 | 12/2001 |
| JP | 2002-115363 | 4/2002 |

OTHER PUBLICATIONS

Office Action from Chinese Patent Office for corresponding Chinese Application No. 201080015638.2, mailed Feb. 26, 2013, 6 pages and 5 pages of English translation.
Office Action from Japanese Patent Office, issued in corresponding Japanese Patent Application No. 2010-086833, dated Jun. 4, 2013, 4 pages in Japanese and 4 pages in its English translation.

\* cited by examiner

DAMPING STRUCTURE

TECHNICAL FIELD

The present invention relates to a damping structure which can be effectively used in a vibrating structure and the like.

BACKGROUND ART

A stator and a rotor of a motor or a generator, gears and rotation shafts of a reduction gear, beam members of a transport machine such as an automobile, a frame structure of a building, a large-sized mechanical structure, a structure for fixing the same, and so on generally vibrate. A damping technique for depressing vibration of such a structure, by providing a damping member having a hollow body in which powder/particle materials such as grain or powder are filled in a closed space, on the structure which is vibrating, has been already developed. This technique has been actually adopted, in a field where the vibration cannot be overcome by a technique using damping material such as elastic material or a vibration absorbing device, which has been heretofore widely employed. Such a technique has been proposed in Patent Documents 1 and 2, and so on.

In the technique disclosed in Patent Document 1, vibration of a motor having various kinds of frequencies and level characteristics is intended to be reduced, by fixing a damping member filled with powder/particle materials to the motor. Moreover, in the technique disclosed in Patent Document 2, cavities are formed in a timing pulley which is meshed with a timing belt for transmitting a motive power, and powder/particle materials are movably disposed in the cavities, thereby to damp vibration generated by the mesh between the timing belt and the pulley, and to reduce noises.

By adopting these techniques, it is certainly possible to obtain the damping effect. However, the damping effect by using the powder/particle materials has such a feature that it has non-linear characteristics, and therefore, there is a problem that by simply filling the cavities with the powder/particle materials, reliable damping effect cannot be obtained, depending on conditions.

Moreover, by adopting these techniques, sufficient damping effect cannot be obtained against vibrations with small amplitudes. The damping effect by using the powder/particle materials is realized by mutual collisions, deformations, and frictions of the powder/particle materials which are generated, when the powder/particle materials move with vibration. Particularly, in case where vibration in a vertical direction is an object to be damped, the powder/particle materials must move against gravitational force. Therefore, there has been a problem that vibration acceleration of 1 G or more is required for obtaining the damping effect.

PRIOR ART DOCUMENT

Patent Document

Patent Document 1: JP-A-2000-46103
Patent Document 2: JP-A-6-288463

SUMMARY OF THE INVENTION

Problems that the Invention is to Solve

This invention has been made in order to solve the above described problems in the prior art, and it is an object of the invention to provide a damping structure capable of obtaining sufficient damping effect even against vibration with small amplitude, by promoting movements of powder/particle materials in a hollow body.

Means for Solving the Problems

According to the invention, it is a damping structure comprising a damping member which is provided on a structure to be damped, wherein the damping member is composed of a hollow body which is filled with a powder/particle materials, with partially leaving a space, and a vibration wall face part which vibrates more violently than the structure to be damped, on receiving vibration, is formed in at least a part of wall face parts of the hollow body.

In the invention, it is preferable that the vibration wall face part is formed of a material having a lower elastic modulus and/or a lower density than the other parts of the hollow body.

Moreover, in the invention, it is preferable that the powder/particle material is in contact with the vibration wall face part when the structure to be damped is not vibrating. It is to be noted that only a part of the powder/particle materials, but not all of them, is in contact with the vibration wall face part.

Further, in the invention, it is preferable that the hollow body has the vibration wall face part, and a rigid wall face part which vibrates with substantially same amplitude as the structure to be damped, and that the powder/particle material is in contact with both the vibration wall face part and the rigid wall face part when the structure to be damped is not vibrating. It is to be noted that only a part of the powder/particle materials, but not all of them, is in contact with the vibration wall face part and the rigid wall face part.

Still further, in the invention, it is preferable that the hollow body has a rigid wall face part which vibrates with substantially same amplitude as the structure to be damped, and the hollow body is mounted to the structure to be damped in a state where the rigid wall face part is in contact with a surface of the structure to be damped.

Still further, in the invention, it is preferable that the vibration wall face part is formed in a wall face part which is not in parallel with a vibration direction of the structure to be damped, out of the wall face parts of the hollow body.

According to the damping structure of the invention, at least a part of the wall face parts of the hollow body vibrates more violently than the structure to be damped, on receiving the vibration. According to this structure, the powder/particle materials more violently move, as compared with a case where all the wall face parts vibrate integrally with the structure to be damped. As the results, mutual collisions, elastic deformations, and frictions are generated in the powder/particle materials, and the damping effect can be reliably realized, even against small vibration having vibration acceleration of less than 1 G.

Moreover, in this invention, in the case where the vibration wall face part is formed of the material having a lower elastic modulus and/or a lower density than the other parts of the hollow body, the vibration wall face part vibrates more violently than the structure to be damped, on receiving vibration. According to this structure, the powder/particle materials more violently move, as compared with a case where all the wall face parts vibrate integrally with the structure to be damped. As the results, mutual collisions, elastic deformations, and frictions are generated in the powder/particle materials, and the damping effect can be reliably realized, even against small vibration having vibration acceleration of less than 1 G.

Moreover, in this invention, in the case where the powder/particle materials are in contact with the vibration wall face part when the structure to be damped is not vibrating, the powder/particle materials reliably receive the vibration from the vibration wall face part when the structure to be damped vibrates. As the results, the powder/particle materials violently move, and stabilized damping effect can be more reliably realized.

Moreover, in this invention, in the case where the powder/particle materials are in contact with both the vibration wall face part and the rigid wall face part when the structure to be damped is not vibrating, the powder/particle materials are reliably brought into contact with the vibration wall face part which is violently vibrating, and the rigid wall face part which is integrally vibrating with the structure to be damped when the structure to be damped also vibrates. According to this structure, the powder/particle materials reliably receive the vibration from the vibration wall face part, and at the same time, the damping effect can be reliably transmitted to the wall face parts. As the results, stabilized damping effect can be more reliably realized.

Moreover, in this invention, in the case where the hollow body is mounted to the structure to be damped in a state where the rigid wall face part is in contact with the surface of the structure to be damped, since the damping member is mounted on the surface of the structure to be damped by way of the rigid wall face part, the damping effect can be reliably transmitted from the wall face part to the structure to be damped. Further, the hollow body can be stably mounted, and stabilized damping effect can be more reliably realized.

Moreover, in this invention, in the case where the vibration wall face part is formed in the wall face part which is not in parallel with the vibration direction of the structure to be damped, out of the wall face parts of the hollow body, excitation of the vibration wall face part is reliably realized, when the structure to be damped vibrates. As the results, stabilized damping effect can be more reliably realized.

MODE FOR CARRYING OUT THE INVENTION

Now, the invention will be further described in detail, referring to embodiments as shown in the attached drawings.

Figure 1:
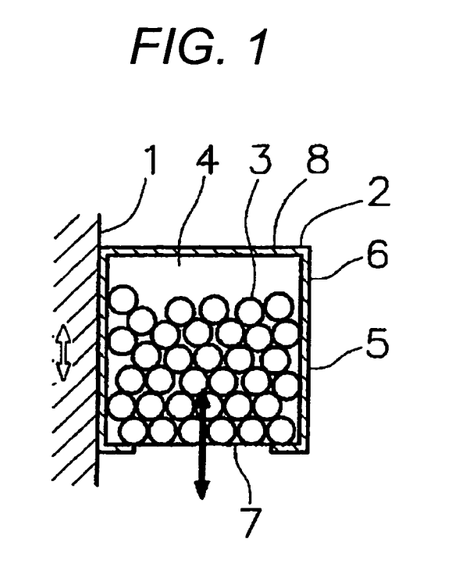
FIG. 1 is a vertical sectional view showing an embodiment of the invention in which a damping member is mounted on a side face of a structure to be damped, which is in parallel with a vibration direction of the structure to be damped.

To begin with, an embodiment in which a damping member 2 is mounted on a side face of a structure 1 to be damped, which is in parallel with a vibration direction of the structure 1 will be described. In the embodiment as shown in FIG. 1, the damping member 2 is so constructed that powder/particle materials 3 are filled in a hollow body 5 which is a container in a rectangular solid shape, with partially leaving a space 4. The powder/particle materials 3 can move inside the hollow body 5, because they are filled in the hollow body 5, with partially leaving the space 4.

The hollow body 5 (damping member 2) which is filled with the powder/particle materials 3 is mounted on a side of the structure 1 to be damped, the side being in parallel with the vibration direction of the structure 1, as shown by a bidirectional white arrow. Out of wall face parts 6 of the hollow body 5 (damping member 2), a part of a bottom face which is perpendicular to the vibration direction, except a surrounding part thereof, is formed as a vibration wall face part 7. The wall face parts 6 except the vibration wall face part 7 are formed as rigid wall face parts 8. In this embodiment, the vibration wall face part 7 has a thinner wall thickness than the rigid wall face parts 8. When the structure 1 is not vibrating, the powder/particle materials 3 are in contact with at least the vibration wall face part 7. In this embodiment, they are in contact with both the vibration wall face part 7 and the rigid wall face parts 8.

The powder/particle materials 3 and the wall face parts 6 of the hollow body 5 are formed of metal such as steel and aluminum, resin such as plastic and rubber, or ceramics such as glass and sintered substance. These materials may be selected according to environment where the damping member 2 is to be used, conditions for use, and so on. For example, heat-resistant material may be selected in the case of high temperature environment, non-magnetic material may be selected in the case of magnetic environment, and highly durable material may be selected in the case of using for a long time. Moreover, the powder/particle materials 3 which are described in this invention mean powder or particle, and may include not only a mixture of the powder and the particle, but also either of the powder or the particle. Further, the hollow body 5 can be mounted to the structure 1 to be damped, by various means such as bonding, fixing with bolts, engagement, etc.

In the case of this embodiment, when the vibration as shown by the bidirectional white arrow in FIG. 1 occurs in the structure 1 to be damped such as a stator of a motor or generator, or a frame structure of a building, the damping member 2 also vibrates in the vertical direction, in the same manner. However, the vibration wall face part 7 which is provided on the bottom face of the hollow body 5 more remarkably vibrates. On this occasion, the powder/particle materials 3 more violently vibrate, because they are in contact with the vibration wall face part 7 which is remarkably vibrating, as compared with a case where they are in contact with only the rigid wall face parts 8.

The powder/particle materials 3 which violently vibrate under influence of the vibration of the vibration wall face part 7 are brought into contact with other powder/particle materials 3, and at the same time, brought into contact with the rigid wall face parts 8 which are vibrating with substantially same amplitude as the structure 1, thereby to move relatively with respect to the rigid wall face parts 8. Because elastic deformations, frictions, and collisions of the powder/particle materials 3 are generated due to these movements, vibration energy of the structure 1 is dispersed, and hence, the vibration of the structure 1 is depressed. The reason why the rigid wall face parts 8 vibrate with the substantially same amplitude as the structure 1 to be damped, but not with the same amplitude, is because the hollow body 5 is mounted to an outside of the structure 1. In this case, even the rigid wall face parts 8 constituting the hollow body 5 do not always vibrate with the same amplitude as the structure 1, but there is such possibility that a slight deviation of the amplitude may occur, when strictly observed.

Specifically, because the movements of the powder/particle materials 3 are amplified by the vibration of the vibration wall face part 7, the large damping effect can be obtained, even in the case where the structure 1 is vibrating at an acceleration of less than 1 G, where the damping effect cannot be obtained according to the prior art.

It is preferable that the vibration wall face part 7 is so constructed as to sympathetically vibrate in a frequency zone to be damped, because the powder/particle materials 3 can be more violently moved in this case.

Figure 2:
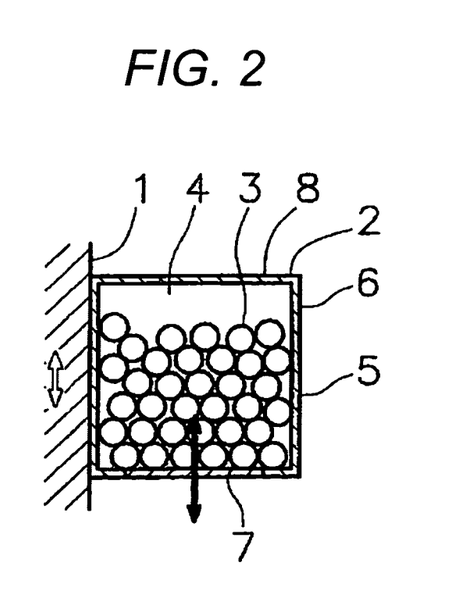
FIG. 2 is a vertical sectional view showing another embodiment of the invention in which a damping member is mounted on a side face of a structure to be damped, which is in parallel with a vibration direction of the structure to be damped.

In the damping member 2 in the embodiment as shown in FIG. 2, a bottom face of a hollow body 5 which is a container in a rectangular solid shape, which is perpendicular to a vibration direction as shown by a bidirectional white arrow, is formed of materials having a lower elastic modulus and/or a lower density than the rigid wall face parts 8, and thus, the bottom face is formed as the vibration wall face part 7. Specifically, the vibration wall face part 7 may be formed of a resin material, while the rigid wall face parts 8 are formed of metallic material. Alternatively, the vibration wall face part 7 may be formed of a material having a lower elastic modulus and/or a lower density, even in the case where the rigid wall face parts 8 and the vibration wall face part 7 are formed of the same metallic material or resin material. In this manner, by forming the vibration wall face part 7 with the material having the lower elastic modulus and/or the lower density than the rigid wall face parts 8, the vibration wall face part 7 more violently vibrate, when vibration occurs in the structure 1, and the powder/particle materials 3 can be more violently moved inside the hollow body 5. As the results, the damping effect can be realized.

Figure 3:
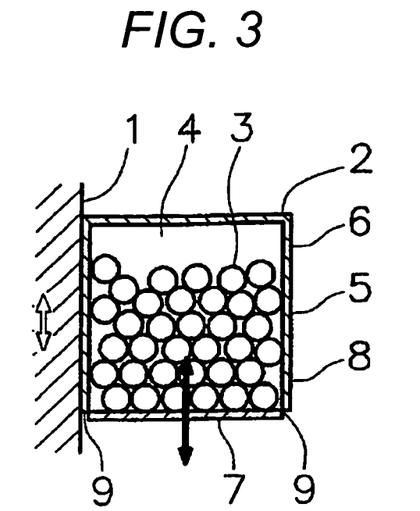
FIG. 3 is a vertical sectional view showing still another embodiment of the invention in which a damping member is mounted on a side face of a structure to be damped, which is in parallel with a vibration direction of the structure to be damped.

In the damping member 2 in the embodiment as shown in FIG. 3, a hollow body 5 which is a container in a rectangular solid shape is formed with slits 9 at both side edges of a bottom face, that is, at an edge on the side of the structure 1 and at an edge on the opposite side thereto. This bottom face is supported only by the parts other than the both side edges, thereby to be formed as the vibration wall face part 7. The vibration wall face part 7 is separated from the rigid wall face parts 8, which are the other faces. In this embodiment too, when vibration occurs in the structure 1, the vibration wall face part 7 more violently vibrates than the rigid wall face parts 8, and thus, the movements of the powder/particle materials 3 inside the hollow body 5 can be made more violent.

Figure 4:
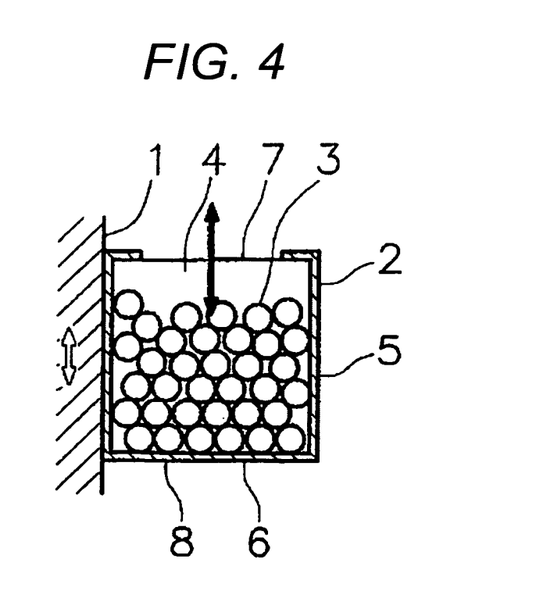
FIG. 4 is a vertical sectional view showing still another embodiment of the invention in which a damping member is mounted on a side face of a structure to be damped, which is in parallel with a vibration direction of the structure to be damped.

In the damping member 2 in the embodiment as shown in FIG. 4, the vibration wall face part 7 is not formed on a bottom face of a hollow body 5 which is a container in a rectangular solid shape, but formed on an upper face of the hollow body 5. It is not favorable to provide the vibration wall face part 7 in such a position, because the powder/particle materials 3 are not in contact with the vibration wall face part 7, when the structure 1 is not vibrating, and there is such possibility that the powder/particle materials 3 are not brought into contact with the vibration wall face part 7, even when the structure 1 vibrates. However, there is also such possibility that the vibration of the vibration wall face part 7 which is formed on the upper face of the hollow body 5 is more remarkably excited, because the upper face of the hollow body 5 is perpendicular to the vibration direction as shown by a bidirectional white arrow, and the powder/particle materials 3 are not loaded thereon. Therefore, it is also possible to adopt this arrangement, provided that the space 4 is set to have an appropriate size.

Figure 5:
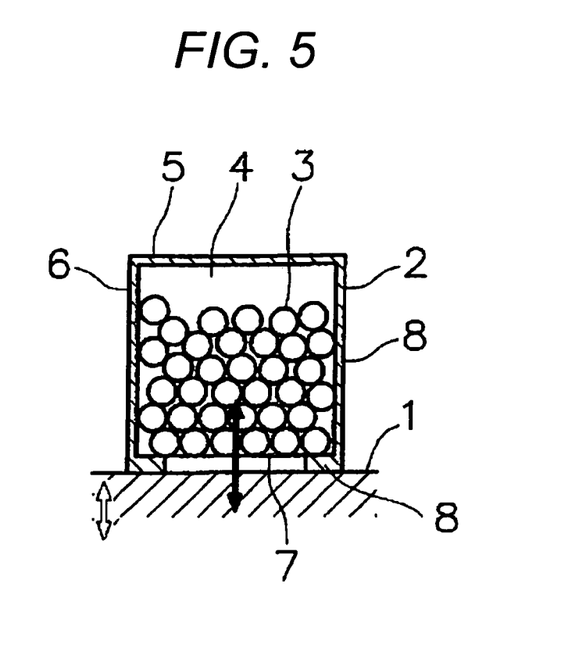
FIG. 5 is a vertical sectional view showing an embodiment of the invention in which a damping member is mounted on an upper face of a structure to be damped, which is perpendicular to a vibration direction of the structure to be damped.
Figure 6:
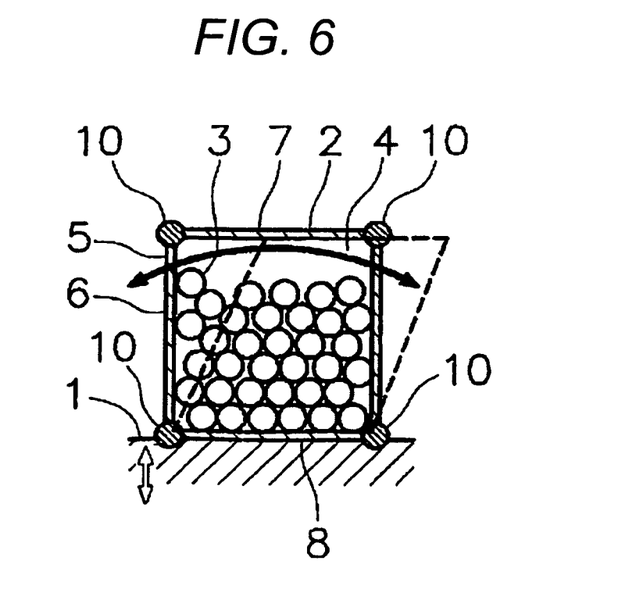
FIG. 6 is a vertical sectional view showing another embodiment of the invention in which a damping member is mounted on an upper face of a structure to be damped, which is perpendicular to a vibration direction of the structure to be damped.

In the embodiments as shown in FIGS. 5 and 6, a hollow body 5 (damping member 2) which is filled with the powder/particle materials 3 is not mounted on a side face of the structure 1 to be damped, which is in parallel with a vibration direction, as shown by a bidirectional white arrow, but on an upper face of the structure 1, which is perpendicular to the vibration direction of the structure 1.

In the damping member 2 in the embodiment as shown in FIG. 5, the vibration wall face part 7 having a thinner wall thickness is formed on a bottom face of the hollow body 5, which is a container in a rectangular solid shape. In this case, in the case where the vibration wall face part 7 is directly mounted to the structure 1, the vibration wall face part 7 vibrates integrally with the structure 1 with the same amplitude, when the vibration occurs in the structure 1. Therefore, the vibration wall face part 7 cannot be directly mounted to the structure 1. Accordingly, in this embodiment, four surrounding sides of the vibration wall face part 7 on the bottom face of the hollow body 5 are formed as the rigid wall face parts 8 having a thicker wall thickness than the vibration wall face part 7, and these rigid wall face parts 8 are mounted to the structure 1. Namely, because the vibration wall face part 7 is not directly mounted to the structure 1, the vibration wall face part 7 is not directly in contact with the structure 1, and a gap is formed between the vibration wall face part 7 and the structure 1. In this manner, the vibration wall face part 7 more remarkably vibrates than the rigid wall face parts 8, when the vibration occurs in the structure 1.

In the damping member 2 in the embodiment as shown in FIG. 6, respective wall face parts 6 of a hollow body 5 which is a container in a rectangular solid shape are joined by means of links 10. By forming the hollow body 5 in this manner, only a bottom face out of the wall face parts 6 is formed as the rigid wall face part 8, while all the other wall face parts 6 function as the vibration wall face parts 7. As the results, the powder/particle materials 3 which are filled in the hollow body 5 more violently move, when vibration occurs in the structure 1.

Figure 7:
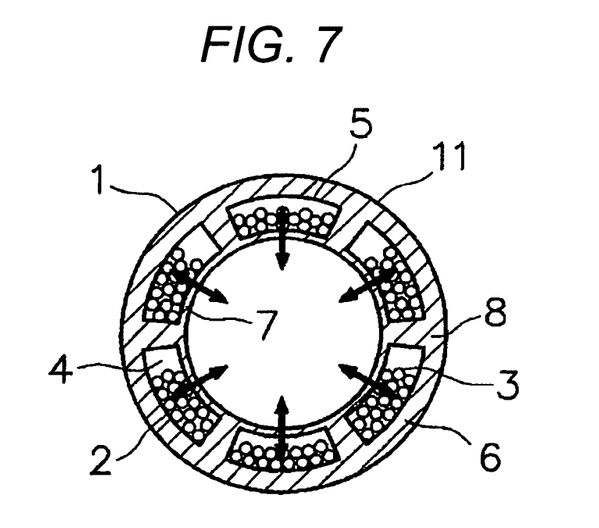
FIG. 7 is a vertical sectional view showing an embodiment of the invention in which damping members are incorporated in a stator of a motor.
Figure 8:
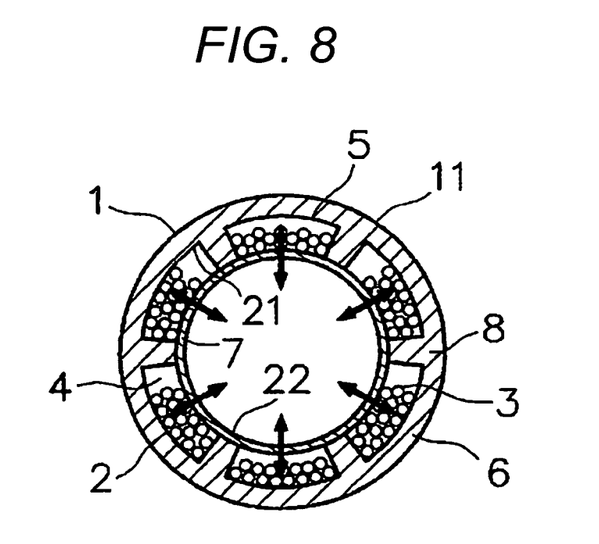
FIG. 8 is a vertical sectional view showing another embodiment of the invention in which damping members are incorporated in a stator of a motor.
Figure 9:
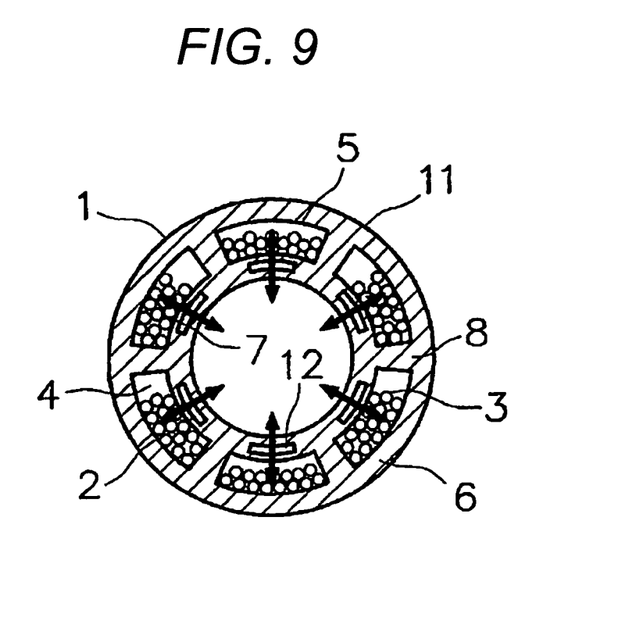
FIG. 9 is a vertical sectional view showing still another embodiment of the invention in which damping members are incorporated in a stator of a motor.

In the embodiments as shown in FIGS. 7 to 9, the structure 1 to be damped is a stator 11 of a motor. Hollow bodies 5 (damping members 2) which are filled with the powder/particle materials 3 are not mounted on a side face of the structure 1, but incorporated in the stator 11 of the motor. The stator 11 has a cylindrical shape, and a plurality of the hollow bodies 5 in a shape of an arc having a same size and filled with the powder/particle materials 3 are formed at equal intervals in a circumferential direction of the stator 11. Although it is preferable that all of the plurality of the hollow bodies 5 have the same size and are formed at the equal intervals, the hollow bodies 5 need not necessarily have the same size, and need not be necessarily formed at the equal intervals.

In the embodiments as shown in FIG. 7, a plurality of the hollow bodies 5 (damping member 2) are formed closer to an inner periphery of a stator 11 in a cylindrical shape. By constructing the hollow bodies 5 in this manner, wall face parts 6 at an inner peripheral side of the hollow bodies 5 are formed as the vibration wall face parts 7 which have a thinner wall thickness than the other wall face parts 6. The other wall face parts 6 function as the rigid wall face parts 8. In the case where the stator 11 is constructed in this manner, the vibration wall face parts 7 more violently vibrate, when vibration occurs in the motor. Therefore, movements of the powder/particle materials 3 in the hollow bodies 5 can be made more violent. As the results, vibration energy is absorbed, and the vibration of the stator 11 can be depressed.

In the embodiment as shown in FIG. 8, the powder/particle materials 3 are filled in a plurality of recesses 21 which are formed at an inner peripheral side of a stator 11 in a cylindrical shape. The plurality of recesses 21 are covered with an annular lid 22 which is formed of a material having a lower elastic modulus and/or a lower density, thereby to form a plurality of hollow bodies 5 (damping members 2). By constructing the hollow bodies 5 in this manner, the inner peripheral sides of the hollow bodies 5 are formed as the vibration wall face parts 7 formed of the material having the lower elastic modulus and/or lower density. The other wall face parts 6 function as the rigid wall face parts 8. In the case where the stator 11 is constructed in this manner, the vibration wall face parts 7 more violently vibrate, when vibration occurs in the motor, and hence, movements of the powder/particle materials 3 in the hollow bodies 5 can be made more violent. As the results, vibration energy is absorbed, and the vibration of the stator 11 can be depressed.

In the embodiment as shown in FIG. 9, a plurality of hollow bodies 5 (damping members 2) are formed inside a stator 11 in a cylindrical shape, and a plurality of cavities 12 are separately formed at inner peripheral sides of the hollow bodies 5. By forming such cavities 12, the inner peripheral sides of the hollow bodies 5, that is, wall face parts 6 at the side where the cavities 12 are formed, can be formed as the vibration wall face parts 7 having a thinner wall thickness than the other wall face parts 6. The other wall face parts 6 function as the rigid wall face parts 8. In the case where the stator 11 is constructed in this manner, the vibration wall face parts 7 more violently vibrate, when vibration occurs in the motor, and hence, movements of the powder/particle materials 3 in the hollow bodies 5 can be made more violent. As the results, vibration energy is absorbed, and the vibration of the stator 11 can be depressed.

Moreover, in the embodiments as shown in FIGS. 7 to 9, it is also possible to form the vibration wall face parts 7 at an outer peripheral side, by respectively providing the hollow bodies 5 in FIG. 7, the recesses 21 in FIG. 8, and the cavities 12 in FIG. 9 at the outer peripheral side.

Figure 10:
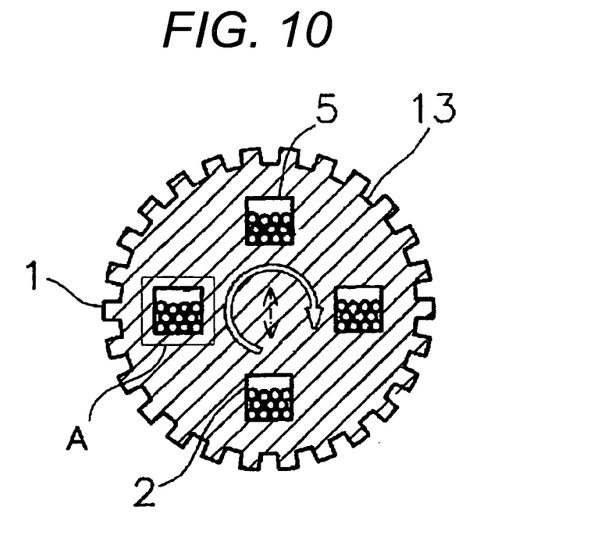
FIG. 10 is a vertical sectional view showing an embodiment of the invention in which damping members are mounted to a gear.
Figure 11:
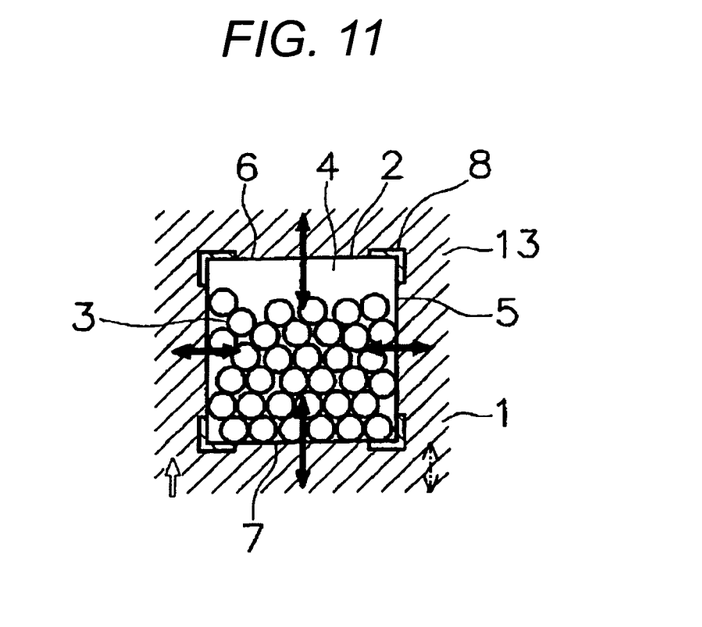
FIG. 11 is an enlarged view of a part A in FIG. 10.
Figure 12:
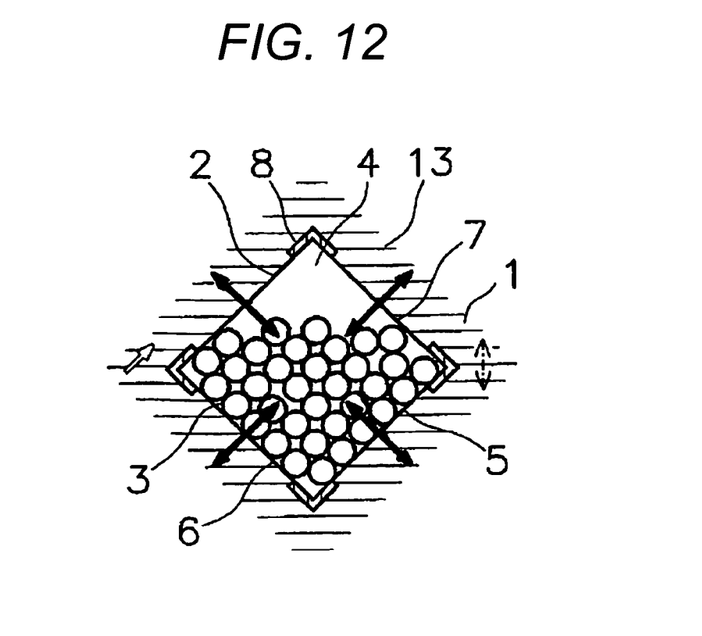
FIG. 12 is an enlarged view of the part A in FIG. 10 which is rotated by 45 degree from a state as shown in FIG. 11.

In the embodiment as shown in FIGS. 10 to 12, the structure 1 to be damped is a gear 13, and hollow bodies 5 (damping members 2) in a rectangular solid shape, which are filled with the powder/particle materials 3, are mounted in the gear 13. In this embodiment, a plurality of the hollow bodies 5 having a same size and filled with the powder/particle materials 3 are mounted in the gear 13 at equal intervals in a circumferential direction of the gear 13. Although in this embodiment too, it is preferable that all of the plurality of the hollow bodies 5 have the same size and are formed at the equal intervals, the hollow bodies 5 need not necessarily have the same size, and need not be necessarily formed at the equal intervals. In FIGS. 10 to 12, a white arrow represents a rotation direction of the gear 13, and a bidirectional broken arrow represents a translatory vibration which is transmitted, for example, from a bearing of the gear. Moreover, bidirectional black arrows represent vibrations of the vibration wall face parts 7. FIG. 11 is an enlarged view of a part A in FIG. 10, and FIG. 12 is an enlarged view of the part A in a state further rotated by 45 degree from a state as shown in FIG. 11.

In this embodiment, the hollow bodies 5 rotate along with the rotation of the gear 13, as shown by the white arrow. Therefore, it is preferable that in each of the hollow bodies, the vibration wall face parts 7 are formed in four wall face parts 6 which are perpendicular to a circumferential direction or a radial direction of the gear 13, as shown in FIGS. 11 and 12. Corners of the hollow body 5 and the remaining wall face parts 6 function as the rigid wall face parts 8. By constructing in this manner, the powder/particle materials 3 can be reliably brought into contact with the vibration wall face parts 7 along with the rotation of the gear 13, whichever position the hollow bodies 5 may take. As the results, vibration energy can be absorbed, and the vibration of the gear 13 can be depressed. It is also possible to employ this embodiment for depressing vibration of the structure 1 which vibrates, while rotating, such as a rotor and its shaft which is used in a motor or a generator, besides the gear. Moreover, the hollow bodies 5 (damping members 2) may be incorporated in the structure 1 which rotates, as in the embodiments as shown in FIGS. 7 to 9.

Figure 13:
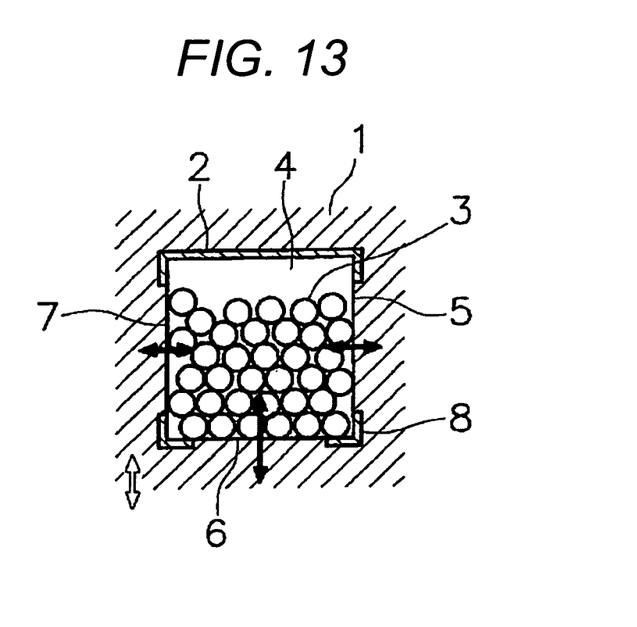
FIG. 13 is a vertical sectional view showing an embodiment of the invention in which vibration wall face parts are formed in three wall face parts of a damping member in a rectangular solid shape.
Figure 14:
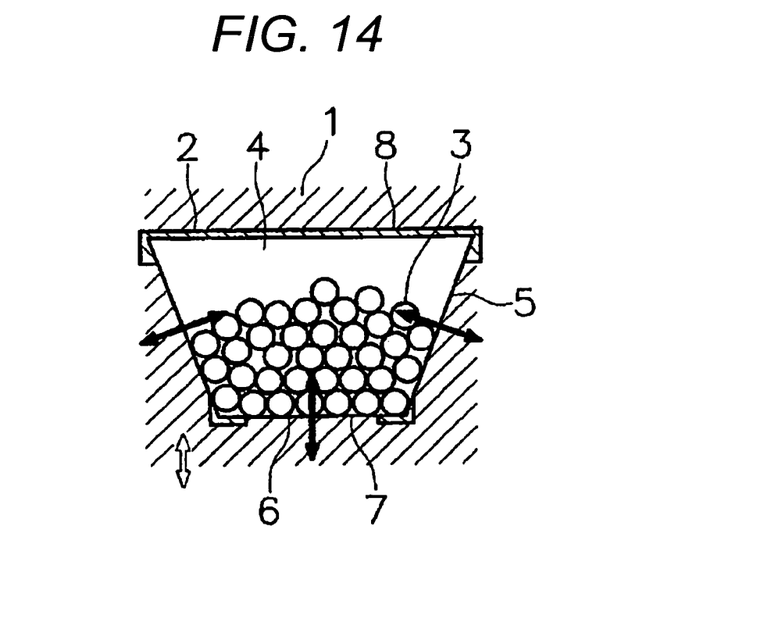
FIG. 14 is a vertical sectional view showing an embodiment of the invention in which vibration wall face parts are formed in three wall face parts of a damping member having a trapezoidal shape in vertical section.
Figure 15:
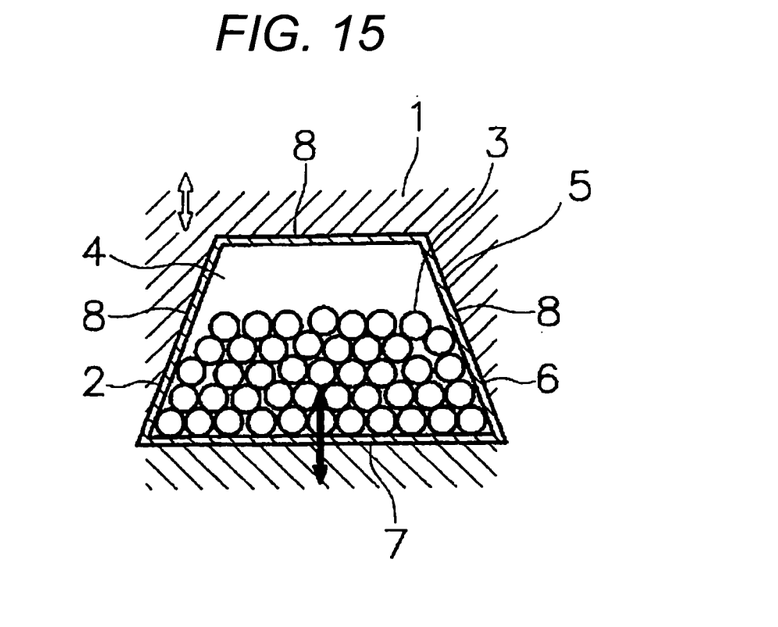
FIG. 15 is a vertical sectional view showing an embodiment of the invention in which a bottom face of a damping member having a trapezoidal shape in vertical section is formed as a vibration wall face part.

In FIGS. 13 to 15, embodiments in which the damping member 2 is mounted on a side face of a structure 1 to be damped, which is in parallel with a vibration direction of the structure 1, will be described. In the embodiment as shown in FIG. 13, the vibration wall face parts 7 are formed on three wall face parts 6 of a hollow body 5 (damping member 2) in a rectangular solid shape. A vibration direction is shown by a bidirectional white arrow. The vibration wall face part 7 formed on a bottom face which is perpendicular to the vibration direction effectively promotes violent movements of the powder/particle materials 3. However, the vibration wall face parts 7 formed on right and left side faces which are in parallel with the vibration direction exert very small influence on the movements of the powder/particle materials 3. It is to be noted that the wall face parts 6 except the vibration wall face parts 7 function as the rigid wall face parts 8.

In the embodiment as shown in FIG. 14, a shape of a hollow body 5 (damping member 2) is modified so that the hollow body 5 has a trapezoidal shape in vertical section, and the wall face parts 6 which are in parallel with the vibration direction are omitted. According to the hollow body 5 having such a shape, in the case where the vibration wall face parts 7 are formed on three wall face parts 6 including a bottom face and right and left side faces, none of the vibration wall face parts 7 is in parallel with the vibration direction which is shown by a bidirectional white arrow. Therefore, all the vibration wall face parts 7 effectively promote violent movements of the powder/particle materials 3. It is to be noted that the wall face parts 6 except the vibration wall face parts 7 function as the rigid wall face parts 8.

Also in the embodiment as shown in FIG. 15, a hollow body 5 has a trapezoidal shape in a vertical sectional view. In this embodiment, all the wall face parts 6 of the hollow body 5 are formed of same material, and have a same wall thickness. However, in the vertical sectional view of the hollow body 5, an upper side and both diagonal sides have a same length in all, and only a bottom side is longer. According to such a structure, a distance between restraint points of the bottom face is longer than that of the other faces, and hence, the bottom face vibrates more violently. Therefore, the bottom face functions as the vibration wall face part 7, and the other wall face parts 6 function as the rigid wall face parts 8.

Figure 16:
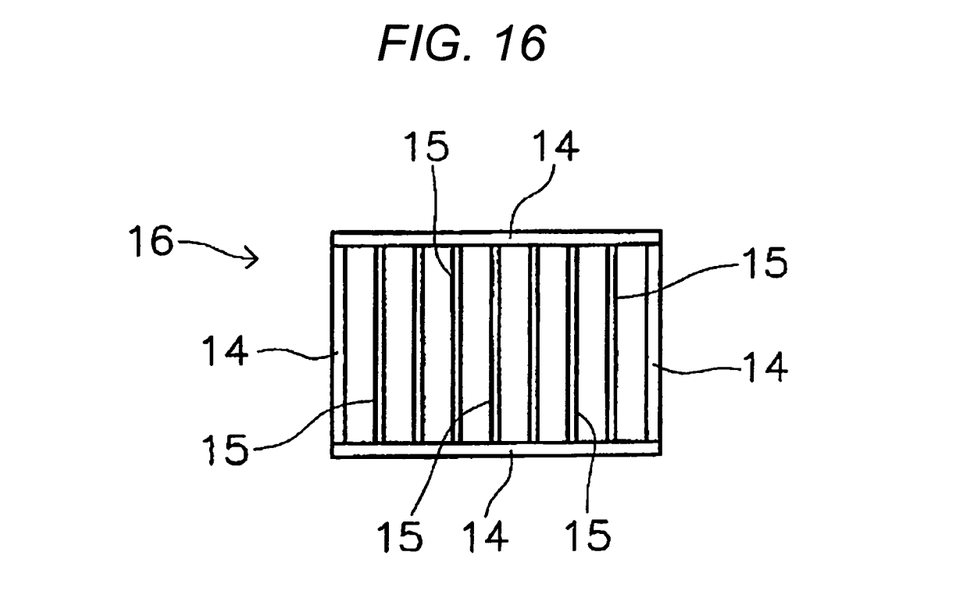
FIG. 16 is a plan view showing a structure of a floor frame when the invention is applied to a floor.

Then, referring to FIGS. 16 to 18, embodiments in which the invention is applied to a floor of architecture such as a house will be described. In these embodiments, the damping structure according to the invention is mainly applied to a floor of an upper story. FIG. 16 shows a structure of a floor frame to be damped in this invention, and FIGS. 17 and 18 show sectional structures of the floors having respectively different structures.

FIG. 16 shows a floor frame 16 including outer frame members 14 which are assembled into a rectangular shape, and a plurality of beam members 15 which are bridged between the outer frame member 14 and the opposed outer frame members 14, in parallel with each other. FIGS. 17 and 18 show a floor having a floor panel 18 which is composed of a floor plate material 17 bonded to an upper face of the floor frame 16. However, it is of course possible to apply this invention to a floor produced according to a conventional production method.

Figure 17:
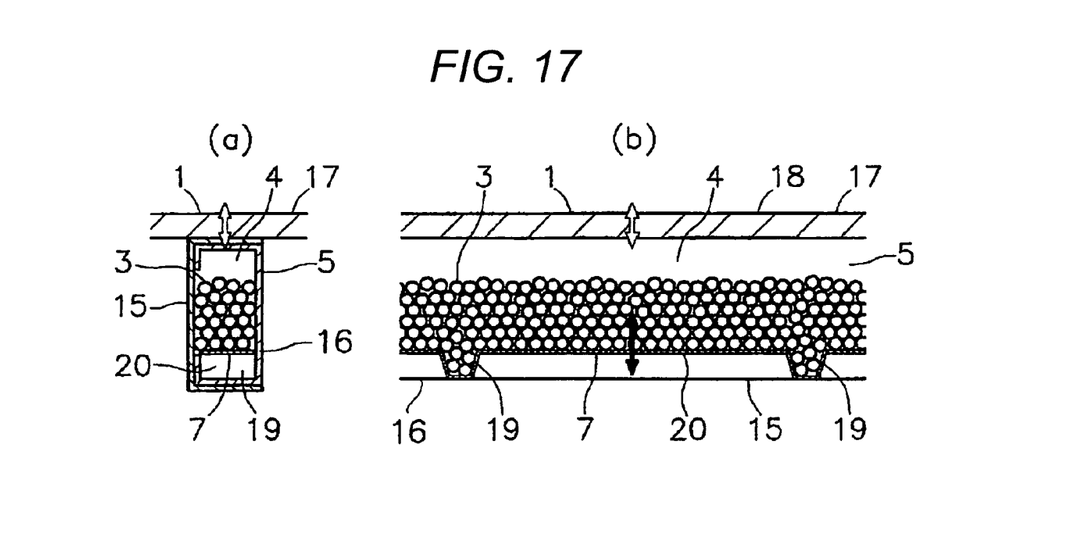
FIG. 17 shows a sectional structure of a floor in an embodiment of the invention when the invention is applied to the floor, of which (a) is a sectional view in a direction perpendicular to a beam member, and (b) is a sectional view in a longitudinal direction of the beam member.
Figure 18:
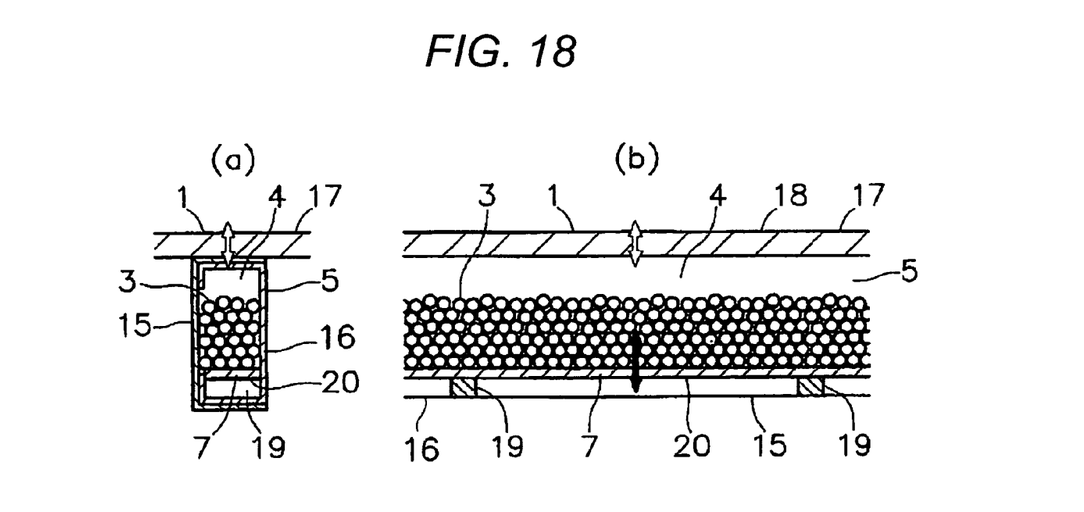
FIG. 18 shows a sectional structure of a floor in another embodiment of the invention when the invention is applied to the floor, of which (a) is a sectional view in a direction perpendicular to a beam member, and (b) is a sectional view in a longitudinal direction of the beam member.

Each of the beam members 15 in the embodiments in FIGS. 16 to 18 is formed in a hollow shape, by combining two pieces of C-shaped steel, and joining the two pieces with screws or the like. A vibration wall face part 7 is provided in a lower part inside this beam member 15. In this embodiment, a hollow body 5 is formed of this vibration wall face part 7 and the beam member 15. In this embodiment, the floor plate material 17 corresponds to the structure 1. The powder/particle materials 3 are filled inside the hollow body 5, with leaving a space 4.

Moreover, in the embodiment as shown in FIG. 17, the vibration wall face part 7 is composed of a plate-like material 20 formed of metal material or resin material. In this embodiment, the plate-like material 20 is bent so as to project downward at a certain interval, thereby to form leg parts 19. In the embodiment as shown in FIG. 18, the vibration wall face part 7 is constructed by placing a plate-like material 20 in a shape of a flat plate formed of wood material, metal material, resin material or the like, on leg parts 19 formed of wood or resin which are arranged to be fixed at a certain interval inside the beam member 15.

When vibration as shown by a bidirectional white arrow occurs in the floor plate material 17 (structure 1) due to walking, jumping or the like on the floor plate material 17 (structure 1), that is, on the floor, the vibration is transmitted to the beam members 15. When the vibration is transmitted from the beam members 15 to the vibration wall face parts 7, the vibration wall face parts 7 more violently vibrate than the structure 1 so that the leg parts 19 function as fulcrums, as shown by a bidirectional black arrow. The powder/particle materials 3 more violently vibrate, because they are positioned on the vibration wall face parts 7 which are violently vibrating, as compared with a case where the vibration wall face parts 7 are not provided. When elastic deformations, frictions, and collisions are generated in the powder/particle materials 3 with the violent movements of the powder/particle materials 3, dispersion of vibration energy of the floor plate material 17 (structure 1) is promoted, and the vibration of the floor plate material 17 (structure 1) is more remarkably reduced.

According to the embodiments of the invention, even in the case where the floor plate material 17 (structure 1) is vibrating at a vibration acceleration of less than 1 G, the movements of the powder/particle materials 3 are amplified by the vibration of the vibration wall face parts 7, and larger damping effect can be obtained. Moreover, it is preferable that the vibration wall face parts 7 are so constructed as to sympathetically vibrate in the frequency zone to be damped, because the powder/particle materials 3 can be more violently moved in this manner. Further, the powder/particle materials 3 may be provided inside the hollow body 5, in a state enclosed in a sac-like body, for the purpose of damp-proofing.

In the above described embodiments, only a case where the structure 1 vibrates in the vertical direction is described, because the damping effect against small vibration in the vertical direction is more remarkably deteriorated, in the prior art. However, the damping structure according to the invention effectively functions, even in the case where the structure 1 vibrates in a horizontal direction or in a diagonal direction or in the case of rotating vibration. Moreover, in the above described embodiments, only a case where the powder/particle materials 3 are filled in a closed space is shown. However, the powder/particle materials 3 need not be necessarily filled in the closed space, unless the powder/particle materials 3 leak out.

EXAMPLES

Now, the invention will be more specifically described by way of examples. However, the invention is not limited to the below described examples, but the invention can be carried out by appropriately adding modifications within a scope adaptable to the gist of the invention. Any of the modifications are included in a technical scope of the invention.

Figure 19:
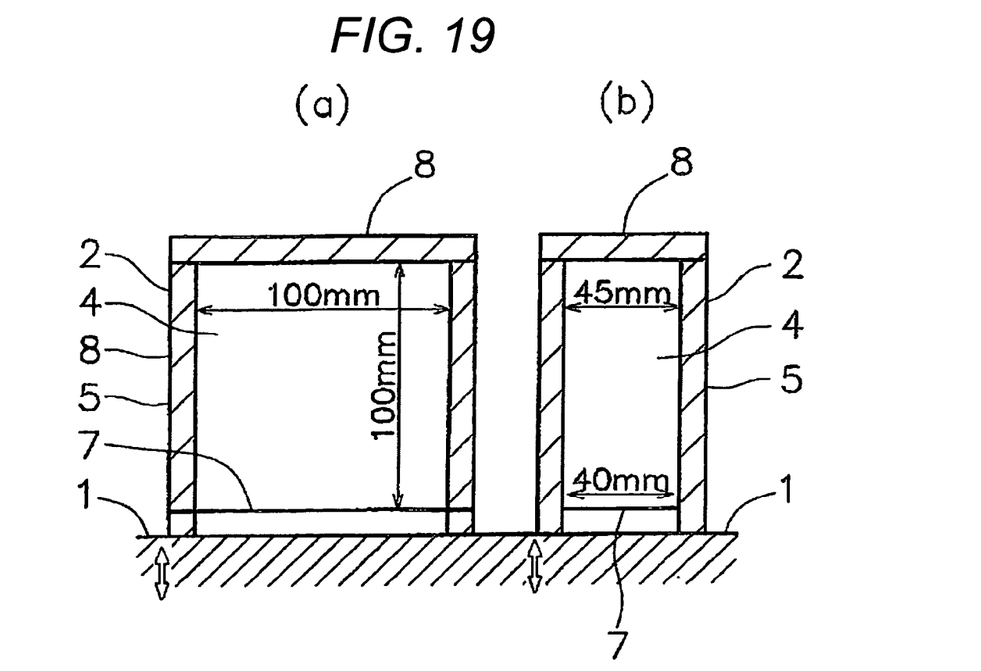
FIG. 19 shows an example of the invention in Examples in which a damping member (a hollow body) is mounted on an upper face of the structure to be damped, which is perpendicular to a vibration direction of the structure to be damped, of which (a) is a vertical sectional view in a direction of a longer side of a vibration wall face part of the damping member, and (b) is a vertical sectional view in a direction of a shorter side of the vibration wall face part of the damping member.
Figure 20:
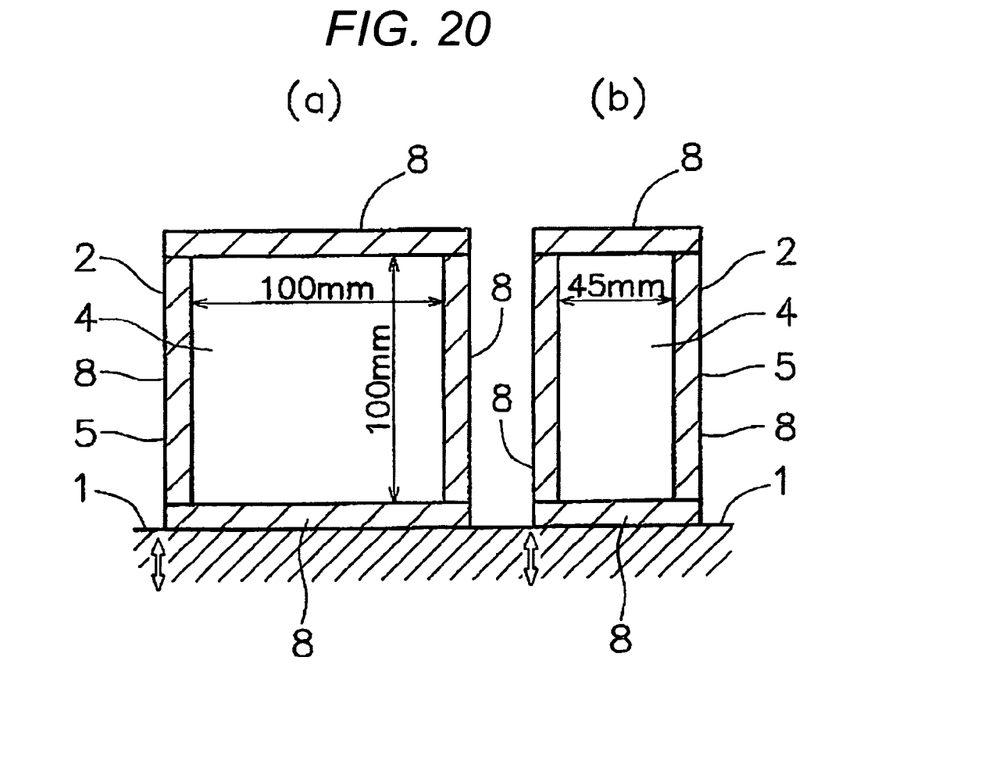
FIG. 20 shows a comparative example of the invention in Examples in which a damping member (a hollow body) is mounted on an upper face of the structure to be damped, which is perpendicular to a vibration direction of the structure to be damped, of which (a) is a vertical sectional view in a direction of a longer side of a vibration wall face part of the damping member, and (b) is a vertical sectional view in a direction of a shorter side of the vibration wall face part of the damping member.

In this example, a hollow body 5 (damping member 2) filled with powder/particle materials 3 is mounted on the upper face of a structure 1 to be damped, which is perpendicular to a vibration direction of the structure 1 as shown by a bidirectional white arrow, in both an example of the invention as shown in FIGS. 19(a) and 19(b), and a comparative example as shown in FIGS. 20(a) and 20(b). It is to be noted that the powder/particle materials 3 are not shown in FIGS. 19 and 20.

In both the example of the invention and the comparative example, a space 4 inside the hollow body 5 is formed in a rectangular solid shape having a size of 100 mm in a vertical direction, 100 mm in a lateral direction, and 45 mm in depth. All the rigid wall face parts 8 are formed of acrylic plates having a wall thickness of 10 mm.

In the example of the invention, the vibration wall face part 7 is formed of an acrylic plate having a wall thickness of 1 mm, and provided on a bottom face of the hollow body 5. A gap of 10 mm is formed between the vibration wall face part 7 and the structure 1. A shorter side out of the four sides of the vibration wall face part 7 is joined by being fitted into the rigid wall face parts 8, as shown in FIG. 19(a). However, at a longer side, the vibration wall face part 7 is not in contact with the rigid wall face parts 8 as shown in FIG. 19(b), and intervals of 2.5 mm are formed between the vibration wall face part 7 and the rigid wall face part 8.

All the powder/particle materials 3 are formed of polypropylene balls, each having a diameter of ½ inch (about 1.27 cm). In both the example of the invention and the comparative example, 174 pieces of the powder/particle materials 3 are filled in the respective hollow bodies 5, and filling rate (volume rate) of them is 75%.

Figure 21:
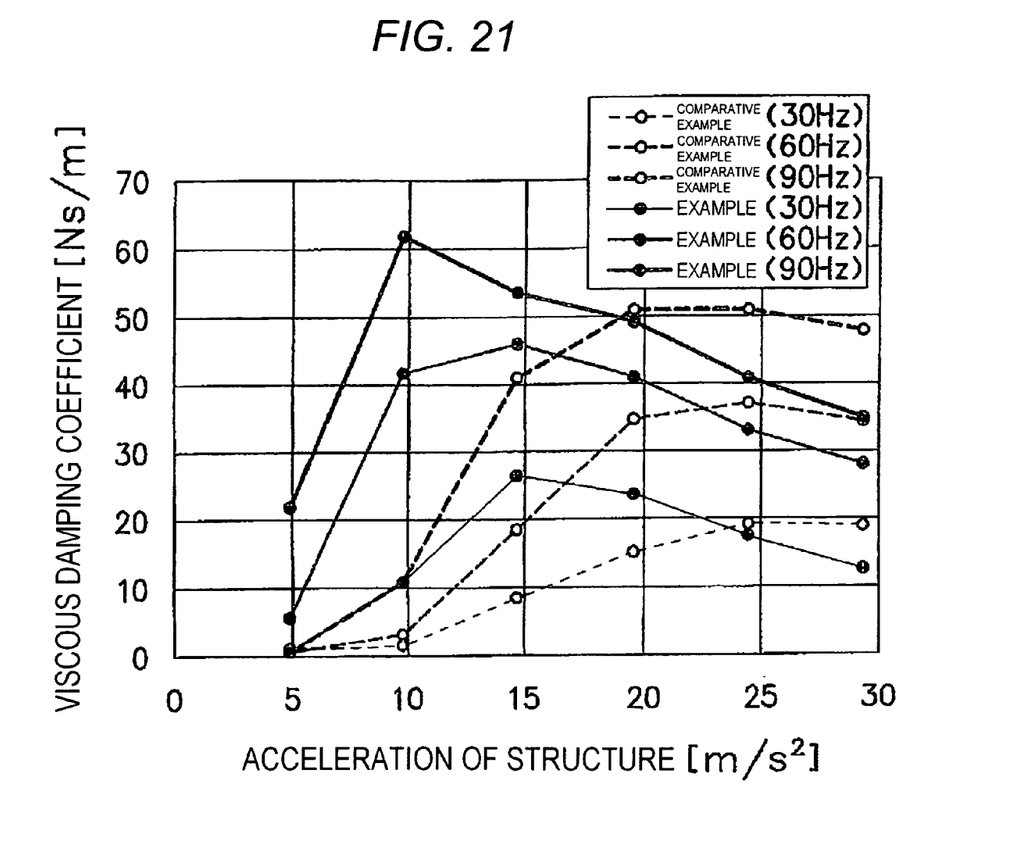
FIG. 21 is a graph showing results of examinations on damping effects in Examples.

In this example, vibrations of various frequencies (30, 60, 90 Hz) are given to the structure 1 to be damped, in the example of the invention as shown in FIGS. 19(a) and 19(b) and in the comparative example as shown in FIGS. 20(a) and 20(b), and the damping effects were examined. The results of the examination are shown in FIG. 21. In FIG. 21, an axis of abscissas represents vibration acceleration of the structure 1, and an axis of ordinates represent a viscous damping coefficient which shows magnitude of a damping force to be exerted on the structure 1 by mounting the damping member 2.

According to FIG. 21, in the comparative example where the vibration wall face part 7 was not provided, the damping force is small at the acceleration of the structure of less than 1 G (9.8 m/s²), and abruptly increased at the acceleration of 1.5 G (14.7 m/s²) or more, in either of the cases where the frequency was 30 Hz, 60 Hz, and 90 Hz. This result clearly shows that in the prior art, a sufficient damping effect cannot be obtained against vibration of small amplitudes, and particularly, in the case where the structure is vibrating at the acceleration of less than 1 G, the damping effect cannot be obtained.

On the other hand, in the example of the invention where the vibration wall face part 7 was provided, a larger damping effect can be obtained even at the acceleration of the structure of less than 1 G (9.8 m/s²), in either of the cases where the frequency is 30 Hz, 60 Hz, and 90 Hz. It can be said that this result shows that the movements of the powder/particle materials 3 in a zone having a small amplitude are promoted to be more violent by the vibration of the vibration wall face part 7, and the damping effect in the zone having the small amplitude is enhanced.

This application is based on Japanese Patent Application No. 2009-095080 filed on Apr. 9, 2009, and Japanese Patent Application No. 2010-086833 filed on Apr. 5, 2010, the contents of which are hereby incorporated by reference.

DESCRIPTION OF THE REFERENCE NUMERALS AND SIGNS

1 Structure
2 Damping member
3 Powder/particle material
4 Space
5 Hollow body
6 Wall face part
7 Vibration wall face part
8 Rigid wall face part
6 Slit
10 Link
11 Stator
12 Cavity
13 Gear
14 Outer frame member
15 Beam member
16 Floor frame
17 Floor plate material
18 Floor panel
19 Leg part
20 Plate-like material
21 Recess
22 Annular lid

The invention claimed is:
1. A damping structure comprising
   a damping member having a rectangular solid shape configured to be provided on a structure to be damped,
   the damping member including a hollow body partially filled with a powder/particle material, partially leaving a space, and
   a vibration wall face part of the hollow body, the vibration wall face part forming only a part of a surrounding, enclosure of the powder/particle material defined by the hollow body, the vibration wall face part vibrates more violently than the structure to be damped on receiving vibration, and other wall face parts of the hollow body defining a remainder of the surrounding enclosure of the powder/particle material defined by the hollow body, the vibration wall face part being formed of a material having at least one of a lower elastic modulus than the other parts of the hollow body, a lower density than the other parts of the hollow body, and a wall thickness thinner than other wall face parts of the hollow body, wherein the other wall face parts of the hollow body are of a rigid material and the powder/particle material is in contact with at least some of the other wall face parts, and
   wherein an amount of movement of the powder/particle material is amplified by vibration of the vibration wall face part above an amount of movement of the powder/particle material by vibration of the other parts of the hollow body.

2. The damping structure according to claim 1, wherein the powder/particle material is in contact with the vibration wall face part when the structure is not vibrating.

3. The damping structure according to claim 1, wherein the vibration wall face part and a rigid wall face part of the other all face parts of the hollow body vibrates with substantially a same amplitude as the structure to be damped, and the powder/particle material is in contact with both the vibration wall face part and the rigid wall face part when the structure is not vibrating.

4. The damping structure according to claim 1, wherein the hollow body has a rigid wall face part of the other wall face parts which vibrates with substantially a same amplitude as the structure to be damped, and the hollow body is mounted with the rigid wall face part in contact with a surface of the structure to be damped.

5. The damping structure according to claim 1, wherein the vibration wall face part is formed in a wall face part which is not in parallel with a vibration direction of the structure to be damped, out of the wall face parts of the hollow body.

\* \* \* \* \*